(12) United States Patent
Bushby

(10) Patent No.: US 9,581,358 B2
(45) Date of Patent: Feb. 28, 2017

(54) MULTI-PHASE PASSIVE THERMAL TRANSFER FOR SUBSEA APPARATUS

(71) Applicant: Donald P. Bushby, Houston, TX (US)

(72) Inventor: Donald P. Bushby, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 287 days.

(21) Appl. No.: 14/448,854

(22) Filed: Jul. 31, 2014

(65) Prior Publication Data

US 2015/0060010 A1 Mar. 5, 2015

Related U.S. Application Data

(60) Provisional application No. 61/872,335, filed on Aug. 30, 2013.

(51) Int. Cl.
| | |
|---|---|
| *F24J 3/08* | (2006.01) |
| *B23P 15/26* | (2006.01) |
| *F17C 1/00* | (2006.01) |
| *F28D 15/02* | (2006.01) |

(52) U.S. Cl.
CPC .............. *F24J 3/08* (2013.01); *B23P 15/26* (2013.01); *F17C 1/007* (2013.01); *F28D 15/02* (2013.01); *Y02E 10/10* (2013.01); *Y10T 29/49353* (2015.01)

(58) Field of Classification Search
CPC .. F24F 5/0046; F24F 2005/0057; F24F 5/005; F24J 3/08; B23P 15/26; F17C 1/007; F28D 15/02; F28D 20/00; Y10T 29/49353; Y02E 10/10; Y02N 10/40
USPC ......... 165/45, 185, 157, 159, 160, DIG. 531
See application file for complete search history.

(56) References Cited

U.S. PATENT DOCUMENTS

| | | | |
|---|---|---|---|
| 5,803,161 A * | 9/1998 | Wahle | F28D 15/0233 165/104.21 |
| 6,353,651 B1 | 3/2002 | Gou et al. | |
| 7,989,984 B2 | 8/2011 | Draper et al. | |
| 8,267,166 B2 | 9/2012 | Damsleth et al. | |
| 2003/0121650 A1 | 7/2003 | Strahle et al. | |
| 2009/0277612 A1* | 11/2009 | Poorte | E21B 36/001 165/104.21 |
| 2009/0314472 A1 | 12/2009 | Kim et al. | |
| 2010/0243817 A1 | 9/2010 | McKinnon et al. | |
| 2011/0017454 A1 | 1/2011 | Sanderlin et al. | |
| 2013/0098070 A1 | 4/2013 | McCormick et al. | |

(Continued)

FOREIGN PATENT DOCUMENTS

| | | |
|---|---|---|
| CN | 103274061 | 9/2013 |
| EP | 2 487 326 A1 | 8/2012 |

(Continued)

OTHER PUBLICATIONS

Bernt, T. et al., "Ormen Lange Subsea Production System", OTC 18965, 2007, pp. 1-10, Offshore Technology Conference, Houston, TX.

(Continued)

*Primary Examiner* — Justin Jonaitis
(74) *Attorney, Agent, or Firm* — ExxonMobil Upstream Research Company Law Dept.

(57) ABSTRACT

A system, including: a subsea pressure vessel; and a passive heat transfer apparatus, wherein the passive heat transfer apparatus penetrates a hull or shell of the subsea pressure vessel.

18 Claims, 3 Drawing Sheets

(56) References Cited

U.S. PATENT DOCUMENTS

| | | | |
|---|---|---|---|
| 2014/0154102 A1 | 6/2014 | Tecza et al. | |
| 2014/0246166 A1* | 9/2014 | Kaasa | E21B 36/001 165/45 |
| 2015/0022975 A1* | 1/2015 | Browne | H01L 23/4012 361/700 |
| 2016/0130913 A1* | 5/2016 | Hatton | E21B 36/001 166/302 |

FOREIGN PATENT DOCUMENTS

| | | |
|---|---|---|
| EP | 2 487 327 A1 | 8/2012 |
| FR | 2 738 872 | 3/1997 |
| WO | WO 01/13692 | 2/2001 |
| WO | WO 2007/055587 | 5/2007 |
| WO | WO 2008/004885 A1 | 1/2008 |
| WO | WO 2013/004277 A1 | 1/2013 |
| WO | WO 2013/041354 | 3/2013 |
| WO | WO 2014/071985 | 5/2014 |

OTHER PUBLICATIONS

Bjerkreim, B. et al, "Ormen Lange Subsea Compression Pilot", OTC 18969, 2007, pp. 1-11, Offshore Technology Conference, Houston, TX.

British Standards Institution, BS EN 13445-3, 2013, Unfired pressure vessels, Part 3: Design, 2 cover pages, pp. 1-5, 47-50, 61-62, 192-273.

British Standards Institution, BS EN 13445-3, 2013, Unfired pressure vessels, Part 3: Design—Annex I and J, pp. 726-774.

British Standards Institution, BS EN 13445-1, 2013, Unfired pressure vessels Part 1: General, pp. 1-39.

British Standards Institution, BS EN 13445-2, 2013, Unfired pressure vessels, Part 2: Materials, cover page and pp. 3-78.

British Standards Institution, BS EN 13445-4, 2013, Unfired pressure vessels, Part 4: Fabrication, pp. 1-50.

British Standards Institution, BS EN 13445-5, 2013, Unfired pressure vessels, Part 5: Inspection and testing, pp. 1-53.

CN 103274061 English (machine) translation of Abstract, Sep. 4, 2013, one page.

Det Norske Veritas, Recommended Practices, DNV-RP-F301, Subsea Separator Structural Designs, Apr. 2007, cover page and pp. 5-41.

Hazel, T. et al., "Impact of Subsea Processing Power Distribution: Subsea Switchgear Module—A Key to Enabling Component in Subsea Installations", OTC 20468, May 3-6, 2010, pp. 1-13, Offshore Technology Conference, Houston, TX.

Hazel, T. et al., "Innovative high-voltage switchgear key to subsea compression", Offshore Magazine, Apr. 11, 2013, 5 pages, vol. 73, issue 4.

Nordvik, B. et al., "Ormen Lange-Challenges in Offshore Project Execution", OTC 18963, 2007, pp. 1-7, Offshore Technology Conference, Houston, TX.

Skofteland, H. et al, "Ormen Lange Subsea Compression Pilot—Subsea Compression Station", OTC 20030, 2009, pp. 1-15, Offshore Technology Conference, Houston, TX.

Young, W. C., *Roark's Formulas for Stress & Strain*, pp. 634-641, 6$^{th}$ edition, McGraw-Hill Inc.

\* cited by examiner

MULTI-PHASE PASSIVE THERMAL TRANSFER FOR SUBSEA APPARATUS

CROSS-REFERENCE TO RELATED APPLICATION

The present application claims the benefit of U.S. Provisional Application No. 61/872,335, filed Aug. 30, 2013, the entire contents of which are hereby incorporated by reference.

TECHNOLOGICAL FIELD

The present technological advancement relates to utilizing a passive transfer of heat from inside a subsea pressure vessel to a body of water external to the subsea pressure vessel.

BACKGROUND

The oil and gas industry has adapted electrical and mechanical equipment for service in a subsea environment. This adaptation involves the installation of heat producing equipment into pressure vessels which are have limited interior space. A pressure vessel, as used herein, is a closed container designed to hold gases or liquids in a pressurized environment. For example, an internal pressure of the subsea pressure vessel may be maintained at about 1 ATM, whereas the pressure outside the subsea pressure vessel may be many ATMs (which is dependent upon at least the depth of the water). The pressure vessel is configured to house a heat producing apparatus associated with oil and/or gas production.

Cooling of heat producing equipment, in a non-subsea environment, is conventionally provided by radiation or natural convection cooling to the surrounding air. Removal of heat can be critical to the reliability, longevity and performance of some equipment. Forced cooling methods (e.g. either liquid or air) require periodic intervention and maintenance, such as replacement of fans, the repairing of leaks, or the addition of coolant.

Conventional practice for adapting equipment for subsea applications includes the use of active heat transfer devices (e.g. pumps, and fans) and components (e.g. filters, fittings, valves, connectors, etc.). For example, interior cooling fans that circulate air as a cooling medium are used in combination with an "active" (meaning with moving mechanical parts and/or requiring electrical power) cooling means. The active cooling means often includes pumps and a heat collection system located on the interior side of the pressure vessel, a penetration through the pressure vessel, and a heat expulsion device (e.g. radiator, exchanger) in communication with the motive device (e.g. pump). These systems typically exchange heat via convection or radiation only via a medium in substantially a single phase only: liquid, in the case of a pump, and air (gas) in the case of fans. The active components contribute to high rates of failure and a need for periodic maintenance. These systems lack the reliability and the ultra-low maintenance requirements desired for subsea applications. The liquid cooling systems often utilize de-ionized water as the cooling medium due to its low electrical conductance as required to cool high power electronics, The use of de-ionized water in forced cooling systems, creates a need to control and maintain water quality and it's contamination levels, a task typically requiring manual intervention and maintenance. The reactive nature of de-ionized water also can cause corrosion leading to leaks and failure in cooling water containment systems, piping, fittings, pumps, seals and other components. Having a subsea system containing heat producing components with the passive cooling of this invention overcomes the issues created by systems requiring forced cooling medium. An advantage of liquid filling the subsea vessel with a dielectric fluid is that it extends the life of the contained equipment by improving heat transfer and by reducing oxygen levels thus reducing corrosion potential on components such as electrical terminations.

SUMMARY

A system, including: a subsea pressure vessel; and a passive heat transfer apparatus, wherein the passive heat transfer apparatus penetrates a hull or shell of the subsea pressure vessel. The passive heat transfer apparatus can include a heat pipe, wherein the heat pipe penetrates a hull or shell of the subsea pressure vessel, and the heat pipe includes an evaporator section disposed on an internal side of the hull or shell of the subsea pressure vessel and a condenser section disposed on an external side of the shell or hull of the subsea pressure vessel, the evaporator section and condenser section being connected to each other via a portion of the heat pipe that extends from the internal side of the subsea pressure vessel to the external side of the subsea pressure vessel through an opening in the shell or hull of the subsea pressure vessel, and the heat pipe is configured to contain a working fluid that travels between the evaporator section and the condenser section.

The system can further include: the working fluid, wherein the heat pipe and the working fluid are configured to transfer heat internal to the subsea pressure vessel to an exterior of the subsea pressure vessel utilizing a phase transition of the working fluid, from a liquid state to a gas state, and condensation back into the liquid state.

The system can further include a liquid that at least partially fills the subsea pressure vessel, wherein a portion of the evaporator section of the heat pipe is in direct contact with the liquid. The liquid can be a heat transfer medium.

The subsea pressure vessel can include a heat producing apparatus that generates the heat internal to the subsea pressure vessel.

The evaporator section can include a member that extends from a main section of the evaporator section towards the heat producing apparatus.

The condenser section can include a plurality of members that extend from a main section of the condenser section. The condenser section can also include a plate with tubing, piping, or channels, wherein the plate follows a curvature of an outer surface of the subsea pressure vessel.

The heat pipe can be axially orientated, relative to the pressure vessel.

A method, including: obtaining a heat pipe with an evaporator section and a condenser section; and disposing the heat pipe in a subsea pressure vessel, wherein the evaporator section is disposed on an internal side of the hull or shell of the subsea pressure vessel and the condenser section is disposed on an external side of the shell or hull of the subsea pressure vessel, the evaporator section and condenser section being connected to each other via a portion of the heat pipe that extends from the internal side of the subsea pressure chamber to the external side of the subsea pressure chamber through an opening in the shell or hull of the subsea pressure vessel.

The method can further include using a working fluid that travels in the heat pipe between the evaporator section and the condenser section to transfer heat internal to the subsea pressure vessel to an exterior of the subsea pressure vessel utilizing a phase transition of the working fluid, from a liquid state to a gas state, and condensation back into the liquid state.

The method can further include: at least partially filling the subsea pressure vessel with a liquid, wherein a portion of the evaporator section of the heat pipe is in direct contact with the liquid. The liquid can be a heat transfer medium.

The method can further include: disposing a heat producing apparatus into the subsea pressure vessel.

BRIEF DESCRIPTION OF THE DRAWINGS

While the present disclosure is susceptible to various modifications and alternative forms, specific examples thereof have been shown in the drawings and are herein described in detail. It should be understood, however, that the description herein of specific examples is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of the present technological advancement. Moreover, certain dimensions may be exaggerated to help visually convey such principles.

DETAILED DESCRIPTION

Figure 1:
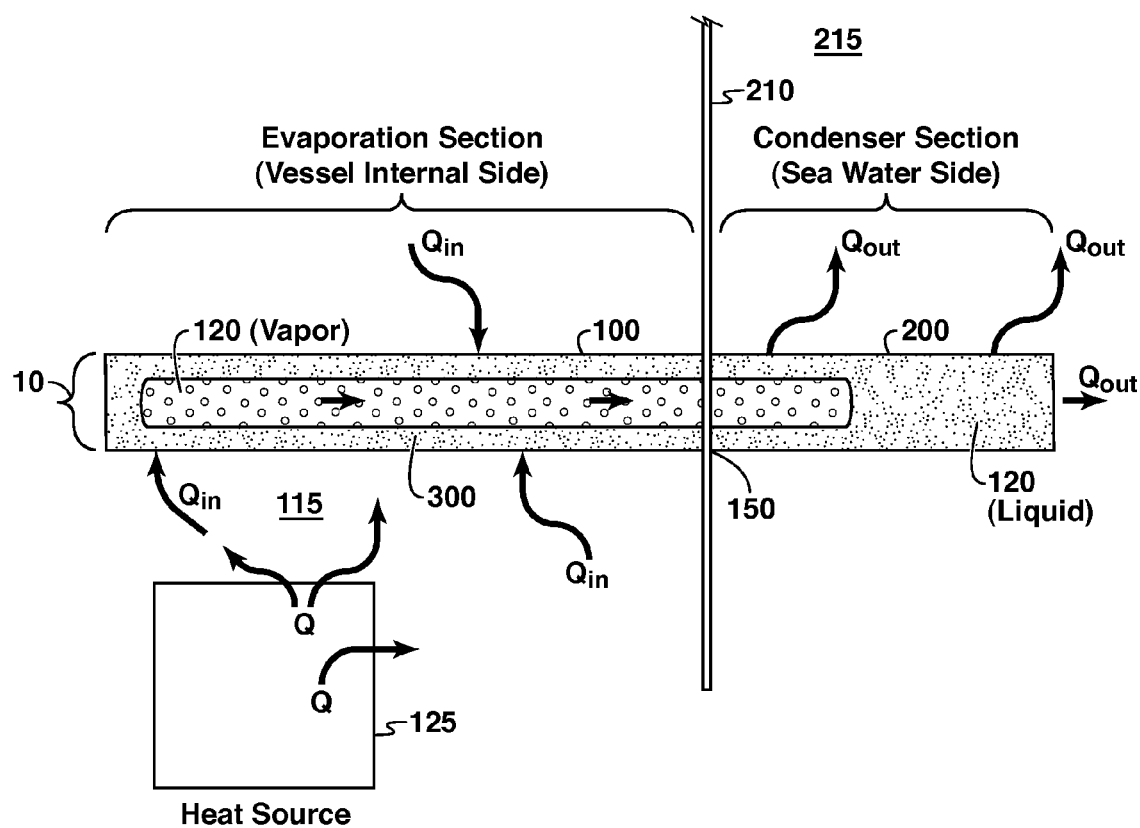
FIG. 1 is a non-limiting example of a heat pipe.

Non-limiting examples of the present technological advancement are described herein. The invention is not limited to the specific examples described below, but rather, it includes all alternatives, modifications, and equivalents falling within the true spirit and scope of the appended claims.

In regards to equipment used in a subsea environment, intervention and maintenance is economically infeasible. Any system installed in a subsea environment must be highly reliable, and remain so for long periods (e.g. many years) between service or before a failure occurs. Failure of a subsea apparatus in service threatens the availability of the subsea apparatus, potentially resulting in millions of dollars in lost oil or gas production, and very high intervention and repair costs.

As used herein, subsea is not limited to oceans. Rather, subsea refers to underwater, wherein the water includes, but is not limited to, oceans, seas, lakes, or rivers.

The subsea equipment can include heat producing components that must be cooled. Such heat producing components can include, but are not limited thereto, electronics (computer processors, sensors, etc.), communications equipment, rotating machinery, generators, and/or engines/motors. Active cooling or heat transfer systems are not an ideal solution to removing the heat generated by such components in a subsea pressure vessel. Active cooling systems consume valuable space inside the pressure vessel and add further weight. Active cooling systems require maintenance, and introduce failure modes, and reduce the meantime before failure, thus requiring costly interventions.

The subsea environment provides a potentially abundant heat sink, as the sea temperature at typical installation depths is only a few degrees above freezing (about 2-4 degrees Celsius). However the shell or hull of the subsea pressure vessel is quite thick (5 inches in some situations) in order to withstand the pressure at deep ocean depths, which restricts efficient heat transfer via convection alone across the vessel shell or hull from the interior to the surrounding sea water.

The present technological advancement provides a highly reliable passive heat transfer system that utilizes a multiphase transition of a working fluid to efficiently transfer heat from the internal side of a subsea pressure vessel to an exterior side of a subsea pressure vessel where it can be expelled into the subsea environment. As used herein, a passive heat transfer apparatus is a device that transfers heat without mechanical moving parts and/or does not require an external power source. A passive heat transfer apparatus is different from the hull or shell of the vessel by itself. Semiconductor devices, such as a peltier device, are active heat transfer devices that require an external power source.

It is an advantage to provide a passive cooling or heat transfer system for a pressure vessel that functions efficiently and has no moving mechanical parts which are prone to failure and require periodic maintenance. The passive heat transfer system can operate for extended periods of time relative to the above-noted conventional active cooling and heat transfer systems.

A system in accordance with the present technological advancement can utilize a heat pipe to cool the internal part of the subsea pressure vessel. As used herein, a heat pipe is vacuum-tight enclosure which is partially filled with a working fluid. A heat pipe can be embodied as a tubular cylinder. However, the heat pipe is not limited to a tubular cylinder. The heat pipe may have a transfer section between the condenser section and the evaporator section that is a tubular cylinder, but the condenser and evaporator sections have different configurations. As used herein, the heat pipe includes the condenser section and the evaporator section and functions as a conduit through which the working fluid travels between the condenser section and the evaporator section because of phase changes of the working fluid.

The heat pipe enclosure can contain a working fluid operating at a suitable vacuum/pressure range inside the heat pipe enclosure to allow efficient state transition from liquid to gas as heat is absorbed and efficient transfer of the latent heat of vaporization to a heat sink (e.g. the surrounding sea water once installed). As used herein, a working fluid is a liquid or gas that undergoes a phase change/transition to absorb or release heat.

The heat pipe, or portions of the heat pipe, may be flexible, have joints, or bellows to allow for ease of construction and assembly of the subsea components/apparatuses inside the pressure vessel. The working fluid may be ammonia, argon or other suitable materials. The heat pipe can have a penetration or temporary opening to allow filling of the heat pipe with the working fluid after installation. The heat pipe may be provided with the working fluid before or after the heat pipe is disposed in the subsea pressure vessel.

The heat pipe passively transfers heat from a source to a heat sink, via a phase change of the working fluid. The heat pipe has an evaporator section where heat is collected and the working fluid transitions from a liquid to a gas. An evaporator section, as used herein, is the portion of the heat pipe used to turn a liquid into a gas by vaporizing or evaporating the liquid. The heat pipe has a condenser section where latent heat is transferred into a heat sink and the working fluid transitions from a gas to a liquid. As used herein, condenser section is the portion of the heat pipe that condenses a substance from its gaseous state to its liquid state by cooling it. As used herein, latent heat is the heat released or absorbed by a body or a thermodynamic system during a constant-temperature process, such as a phase change/transition. The working fluid, whether in gas or liquid phase, can travel in the heat pipe to/from the condenser section and the evaporator section. The section of heat pipe between the evaporator section and the condenser section may be regarded as a transfer section.

In the evaporator section, the working fluid absorbs heat from the heat source, which causes the working fluid to vaporize and create a pressure gradient in the heat pipe. This pressure gradient causes the vapor or gas to move to the condenser section, where the vapor or gas is condensed. Condensing of the vapor or gas transfers heat to the cooler surroundings, thus turning it back to a liquid state. The physical arrangement and orientation of the heat pipe can allow the condensed liquid to return to the evaporator section by gravity (e.g. no forced mechanical means used because this is a passive heat transfer system) to repeat the cycle of heat removal from the source and transfer of heat to the heat sink. The physical arrangement and orientation of the heat pipe could also allow the condensed liquids to flow by capillary motion back to the evaporator section to allow continuous or repetitive cooling cycles.

The passive heat transfer system of the present technological advancement can utilize the latent heat of vaporization and change of cooling medium phase to efficiently transfer heat from a first liquid/gas inside a pressure vessel across the pressure vessel shell boundary to a second liquid (e.g. the surrounding sea water) as a heat sink.

In the present technological advancement, the evaporator section for the heat pipe can be located on an interior side of the pressure vessel, and the condenser section for the heat pipe can be located on the exterior side of the subsea pressure vessel. The evaporator section and the condenser section can be in thermal communication through a section of the heat pipe that penetrates through the hull or shell of the pressure vessel. Penetrate and its variations, as used herein, means to pass, extend, or pierce entirely through something.

The heat pipe can have thinner walls than the much larger pressure vessel. These thinner walls pose a much lower restriction of heat convection via the heat pipe walls to the surrounding sea water than the much thicker pressure vessel walls, while still being capable of enduring the high pressures imposed by the depth of the subsea installation.

The present technological advancement may be embodied with one or more heat pipes. Those of ordinary skill in the art can determine the number of heat pipes based on their particular size constraints and heat transfer requirements. The arrangement of the one or more heat pipes may be axially orientated, relative to the pressure vessel, to allow insertion of the subsea heat producing apparatus during construction. However, the one or more heat pipes are not required to be axially oriented, and other orientations could be possible or desirable.

The interior of the vessel may be gas filled (e.g. inert gas, air, SF6 or nitrogen) or could be and preferably be liquid filled, with a liquid such as insulating oil or a Flouroinert™. The liquid fill can enhances thermal continuity from the heat producing apparatuses (e.g. power electronics, motors, pumps, and/or hydraulic systems) contained within the pressure vessel to the evaporator section of the heat pipe. The pressure vessel can have a penetration or temporary opening in the hull or shell to allow filling after the pressure vessel is provided with its internal components.

While the heat pipe is a passive heat transfer apparatus, it may be used along with auxiliary (non-essential) active components, the failure of which may impact overall cooling performance, but not disable the cooling function of the heat pipe. For example, circulation pumps or fans can be located within the pressure vessel in order to move the liquid fill inside the subsea pressure vessel to improve heat transfer between the heat producing apparatuses and the evaporator section of the heat pipe. Alternatively, additional heat pipes which do not penetrate the vessel could be used to aid in heat transfer within the vessel.

The pressure vessel used with the present technological advancement can theoretically be almost any shape, but sections of spheres, cylinders, and cones are usually employed. A common design for such a pressure vessel is a cylinder with an end cap called a head. Head shapes are frequently either hemispherical or dished (torispherical). The examples in FIG. 2 includes a hemispherical end cap, but the opposite end may be hemispherical as well, or another suitable shape for a given application. More complicated shapes have historically been much harder to analyze for safe operation and are usually far more difficult to construct, but are feasible and can be used along with the present technological advancement.

The heat pipe penetrates the shell or hull of the pressure vessel so that the evaporator section is disposed inside the pressure vessel and the condenser section is disposed outside the pressure vessel. A penetration through the pressure vessel wall allows for continuity of heat pipe through the wall. The heat pipe can be welded in place to seal an area where the heat pipe penetrates the shell or hull of the pressure vessel. The portion of the heat pipe welded to the pressure vessel may have a wall thickness larger than other portions of the heat pipe in order to ensure adequate structural integrity.

A thickness of the heat pipe can be constant or vary along its longitudinal direction, such that the evaporator section and/or condenser section have a thinner wall thickness than a portion of the heat pipe that passes through the shell or hull of the subsea pressure vessel. A person of ordinary skill in the art could determine minimum thickness for wall of the heat pipe and walls of the subsea pressure vessel in order to ensure structural integrity and provide sufficient cooling.

The hull or shell of the pressure vessel can have a much thicker material construction than the heat pipe, and thus can possess a higher thermal resistivity than the walls of the heat pipe. The smaller cross sectional area of the heat pipe, along with its geometry, can be used to minimize the required wall thickness. Both the vessel and the heat pipe are fabricated of suitable metals, and could be built to relevant standards, such as ASME BPVC Section II, EN 13445-2 (which contains a list of approved materials with associated limitations in temperature range). Theoretically, almost any material with good tensile properties that is chemically stable in the chosen application could be employed. Steel is an example that may be suitable for many applications. However, the evaporator section and/or the condenser section can be made of a different material than remaining portions of the heat pipe in order to improve thermal conductivity.

FIG. 1 is a diagram of an exemplary heat pipe 10 penetrating through opening 150 in a shell or hull of subsea pressure vessel 210. A working fluid 120 absorbs heat Q at the evaporator section 100 contacting the space inside the pressure vessel containing the heat source 125, is diffused in vapor 120 inside the body of the heat pipe 10, travels along the heat transfer section of the heat pipe, and dissipates the heat at the condenser section 200, which is located outside the pressure vessel and in contact with the surrounding sea water 215. The vaporized working fluid that dissipates the heat is condensed and changed back to a liquid phase at the condenser section 200. Then, the working fluid returns along a wall of the wick 300 of the heat pipe to the evaporation section 100. The working fluid inside the heat pipe repeatedly carries out the condensation and evaporation processes to transfer the heat.

A wick 300 can line an inner surface of the heat pipe and form a capillary structure that moves the working fluid, while in liquid phase, from the condenser section to the evaporator section. The heat pipe wick structure can include, but is not limited thereto: axial grooves on the inner heat pipe wall, screen/wire and sintered powder metal. Other wick structures include arteries, bi-dispersed sintered powder and composite wick structures.

The temperature of the evaporator section 100 and the heat transfer section is higher than that of the condenser section 200, which is at or near sea water temperature (which at the installation depths may be in the range of 2-4 degrees C.). The vapor pressure at each section is a saturated vapor pressure. The pressure of the evaporator section and the heat transfer section is higher than that of the condenser section 200. As a result, the vapor travels through the heat transferring section from the evaporator section to the condenser section, and heat transfer is very rapidly performed. The performance of the heat pipe can be influenced by various parameters such as the wick structure circulating the working fluid, the nature of the working fluid, the filling amount of the working fluid, the degree of vacuum, and the like.

Figure 2:
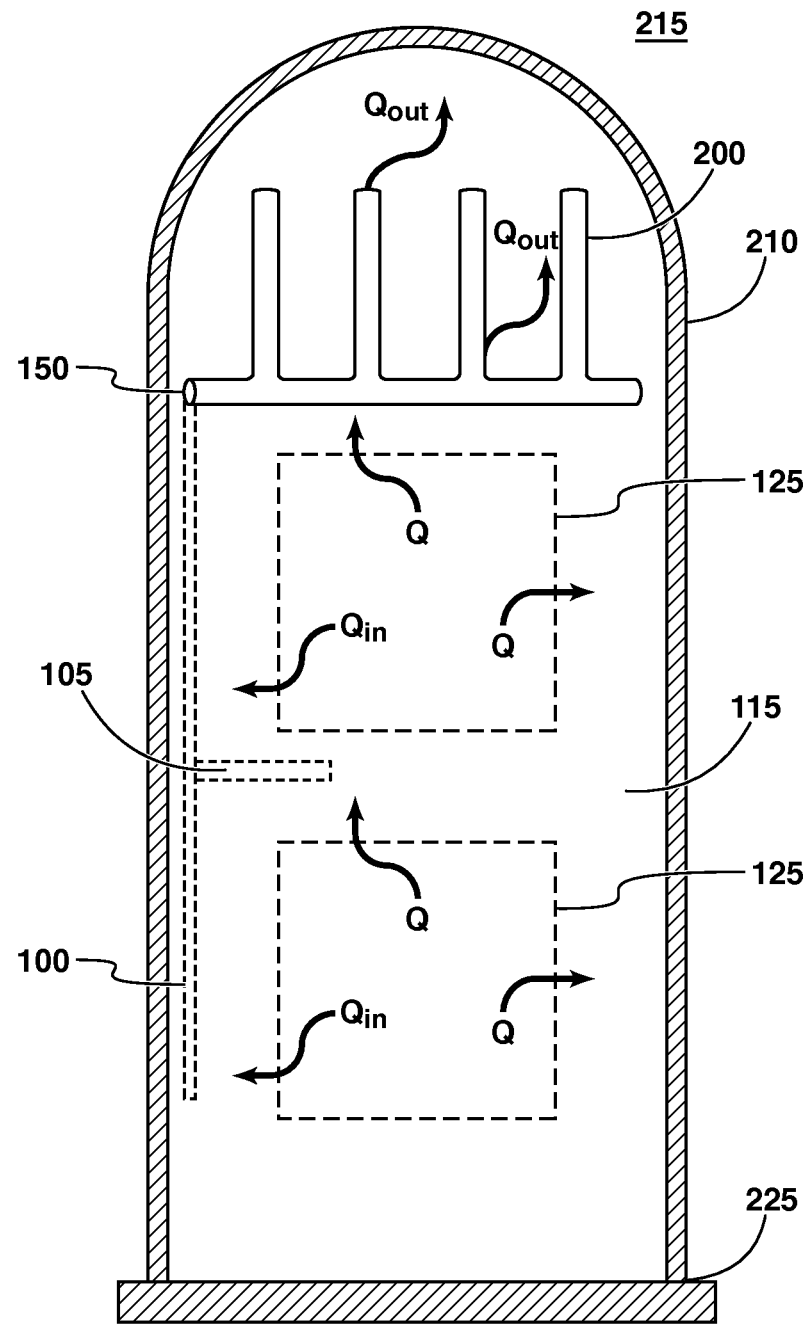
FIG. 2 is a non-limiting example of the heat pipe disposed in a subsea pressure vessel.

FIG. 2 is an example of the heat pipe disposed in a subsea pressure vessel. Solid lines indicate the outer shell or hull of the subsea pressure vessel and components external to the subsea pressure vessel, and dashed lines indicate components internal to the subsea pressure vessel. FIG. 2 includes some features described with regard to FIG. 1, the same reference numbers are used and further description is not necessarily provided.

In FIG. 2, the evaporator section 100 includes a split section 105 that branches off from the evaporator section main body. The split section 105 can be configured to be more closely disposed to heat source 125 in order to improve thermal communication. Split section 105 or evaporator section 100 can be in direct physical contact with the heat source 125. As discussed above, the pressure vessel 210 may be filled with heat transfer medium (liquid fill or gas fill) 115. When using heat transfer medium 115, the split section 105 and/or the evaporator section 100 could be physically and directly or indirectly connected to the heat source 115. It is desirable to place the evaporator (or a portion thereof) in close contact with the heat source. However, in achieving this close contact, a problem is created during construction or assembly of the internal heat producing components (examples of which were noted above) into the pressure vessel. Typical construction practice often assembles the equipment as a module and then slides it into place in the vessel via the flanged end of the vessel. Arranging one or more heat pipes to make direct contact with multiple heat sources on a slide in module as it is installed into the pressure vessel is a current barrier to the use of heat pipes in a subsea pressure vessel. Immersing the heat source(s) in a heat transfer medium 115 overcomes the problem of trying to achieve close contact with at least a portion of the evaporator section, while still allowing adequate heat transfer. The use of heat transfer medium 115 overcomes the problem of requiring direct contact for efficient heat transfer. The subsea vessel may include assembly flange 225, which closes the subsea pressure vessel after internal components are installed.

The condenser section part of the heat pipe could be made of appropriate tubing, piping, channels, a flat plate design or any other suitable configuration. For example, the condenser section can include a plate, with channels or tubes, which follows a curvature of the outer surface of the subsea pressure vessel. The condenser section 200 may include multiple members that extend from a main portion of the condenser section 200, which can provide a larger surface area in order to more efficiently transfer heat to the surrounding water.

Figure 3:
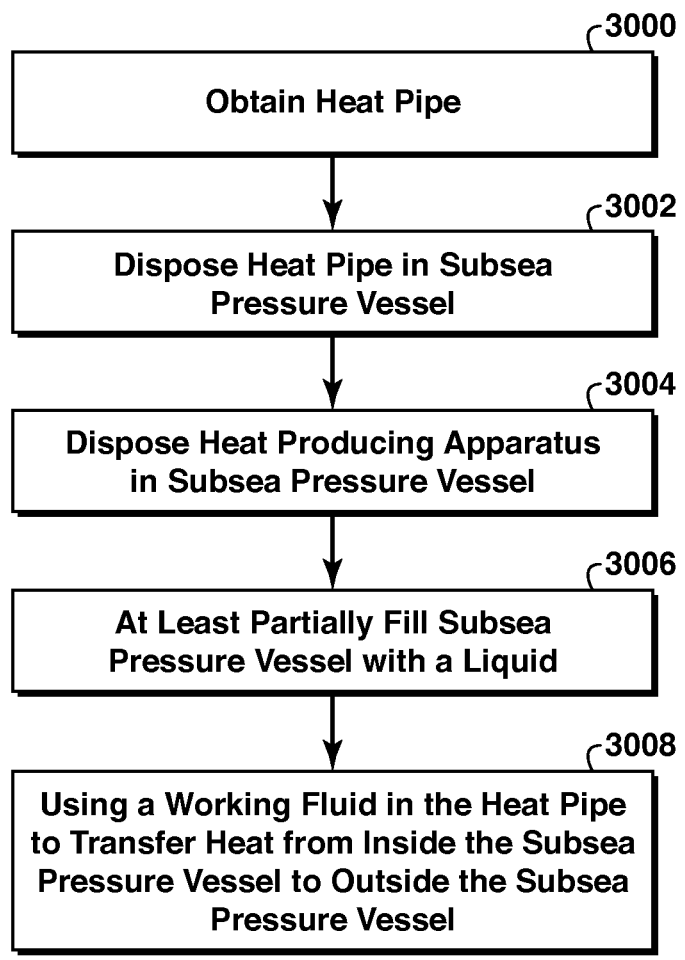
FIG. 3 is a non-limiting example of a method of using the heat pipe.

FIG. 3 depicts an exemplary method of building and using the system of a heat pipe and subsea pressure vessel as discussed above. Step 3000 includes obtaining a heat pipe with an evaporator section and a condenser section. Step 3000 of obtaining a heat pipe may additionally include constructing or assembling materials to form a heat pipe. Step 3002 includes disposing the heat pipe in a subsea pressure vessel, wherein the evaporator section is disposed on an internal side of the hull or shell of the subsea pressure vessel and the condenser section is disposed on an external side of the shell or hull of the subsea pressure vessel, the evaporator section and condenser section being connected to each other via a portion of the heat pipe that extends from the internal side of the subsea pressure chamber to the external side of the subsea pressure chamber through an opening in the shell or hull of the subsea pressure vessel. This disposing step can involve installing the heat pipes as a single unit or installing the heat pipe as a series of discrete parts that are subsequently joined together to provide a closed environment. Step 3004 includes disposing a heat producing apparatus that generates the heat into the subsea pressure vessel. Step 3006 includes at least partially filling the subsea pressure vessel with a liquid, wherein a portion of the evaporator section of the heat pipe is in direct contact with the liquid. Step 3008 includes using a working fluid that travels in the heat pipe between the evaporator section and the condenser section to transfer heat internal to the subsea pressure vessel to an exterior of the subsea pressure vessel utilizing a phase transition of the working fluid, from a liquid state to a gas state, and condensation back into the liquid state. However, these steps do not necessarily have to be performed in this order and that the order of some steps can be altered. A person of ordinary skill can adjust the order of the steps based on their specific design criteria.

The present technological advancement provides significant benefits when compared to conventional techniques that rely upon active heat transfer systems. It is difficult for a subsea vessel with an active heat transfer system to achieve a mean-time-to-intervention of 5 years or more. However, the passive heat transfer system of the present technological advancement can achieve a mean-time-to-intervention in excess of 20 years. This provides significant and unexpected benefits over conventional technology.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A system, comprising:
   a closed subsea pressure vessel including a heat transfer medium and a heat producing apparatus that generates heat internal to the subsea pressure vessel; and
   a passive heat transfer apparatus including a heat pipe, wherein a portion of the heat pipe penetrates a hull or shell of the subsea pressure vessel and the heat pipe has an evaporator section disposed on an internal side of the hull or shell of the subsea pressure vessel close to the heat producing apparatus and in direct contact with the heat transfer medium and a condenser section disposed on an external side of the hull or shell of the subsea pressure vessel, and wherein the evaporator section is connected to the condenser section via the portion of the heat pipe that penetrates the hull or shell of the subsea pressure vessel, and wherein the heat pipe contains a working fluid which travels between the evaporator section and the condenser section and between the condenser section and the evaporator section through the portion of the heat pipe that penetrates the hull or shell of the subsea pressure vessel due to phase transitions of the working fluid.

2. The system of claim 1, wherein
   the evaporator section includes a member that extends from a main section of the evaporator section towards the heat producing apparatus.

3. The system of claim 1, wherein
   the condenser section includes a plurality of members that extend from a main section of the condenser section.

4. The system of claim 1, wherein the heat pipe is axially orientated, relative to the subsea pressure vessel.

5. The system of claim 1, wherein a condensed working fluid travels between the condenser section and the evaporator section by gravity.

6. The system of claim 1, wherein a condensed working fluid travels between the condenser section and the evaporator section by capillary motion.

7. The system of claim 1, wherein the heat pipe further comprises a wick lining an inner surface of the heat pipe that moves a condensed working fluid from the condenser section to the evaporator section.

8. The system of claim 1, wherein the working fluid is ammonia or argon.

9. A method, comprising:
   obtaining a heat pipe with an evaporator section and a condenser section;
   disposing the heat pipe in a closed subsea pressure vessel, wherein the subsea pressure vessel includes a heat transfer medium, the evaporator section is disposed on an internal side of the hull or shell of the subsea pressure vessel close to a heat producing apparatus within the subsea pressure vessel and in direct contact with the heat transfer medium, and the condenser section is disposed on an external side of the hull or shell of the subsea pressure vessel, and wherein the evaporator section and condenser section are connected to each other via a portion of the heat pipe that extends from the internal side of the subsea pressure vessel to the external side of the subsea pressure vessel through an opening in the hull or shell of the subsea pressure vessel; and
   using a working fluid within the heat pipe to transfer heat from the heat producing apparatus within the subsea pressure vessel, the working fluid traveling between the evaporator section and the condenser section and between the condenser section and the evaporator section through the portion of the heat pipe extending through the opening in the hull or shell of the subsea pressure vessel due to phase transitions of the working fluid.

10. The method of claim 9, further comprising:
    at least partially filling the subsea pressure vessel with the heat transfer medium.

11. The method of claim 9, further comprising:
    disposing the heat producing apparatus into the subsea pressure vessel.

12. The method of claim 11, wherein
    the evaporator section includes a member that extends from a main section of the evaporator section towards the heat producing apparatus.

13. The method of claim 9, wherein
    the condenser section includes a plurality of members that extend from a main section of the condenser section.

14. The method of claim 9, wherein the heat pipe is axially orientated, relative to the subsea pressure vessel.

15. The method of claim 9, wherein a condensed working fluid travels between the condenser section and the evaporator section by gravity.

16. The method of claim 9, wherein a condensed working fluid travels between the condenser section and the evaporator section by capillary motion.

17. The method of claim 9, wherein the heat pipe further comprises a wick lining an inner surface of the heat pipe that moves a condensed working fluid from the condenser section to the evaporator section.

18. The method of claim 9, wherein the working fluid is ammonia or argon.

* * * * *